United States Patent Office 3,397,512
Patented Aug. 20, 1968

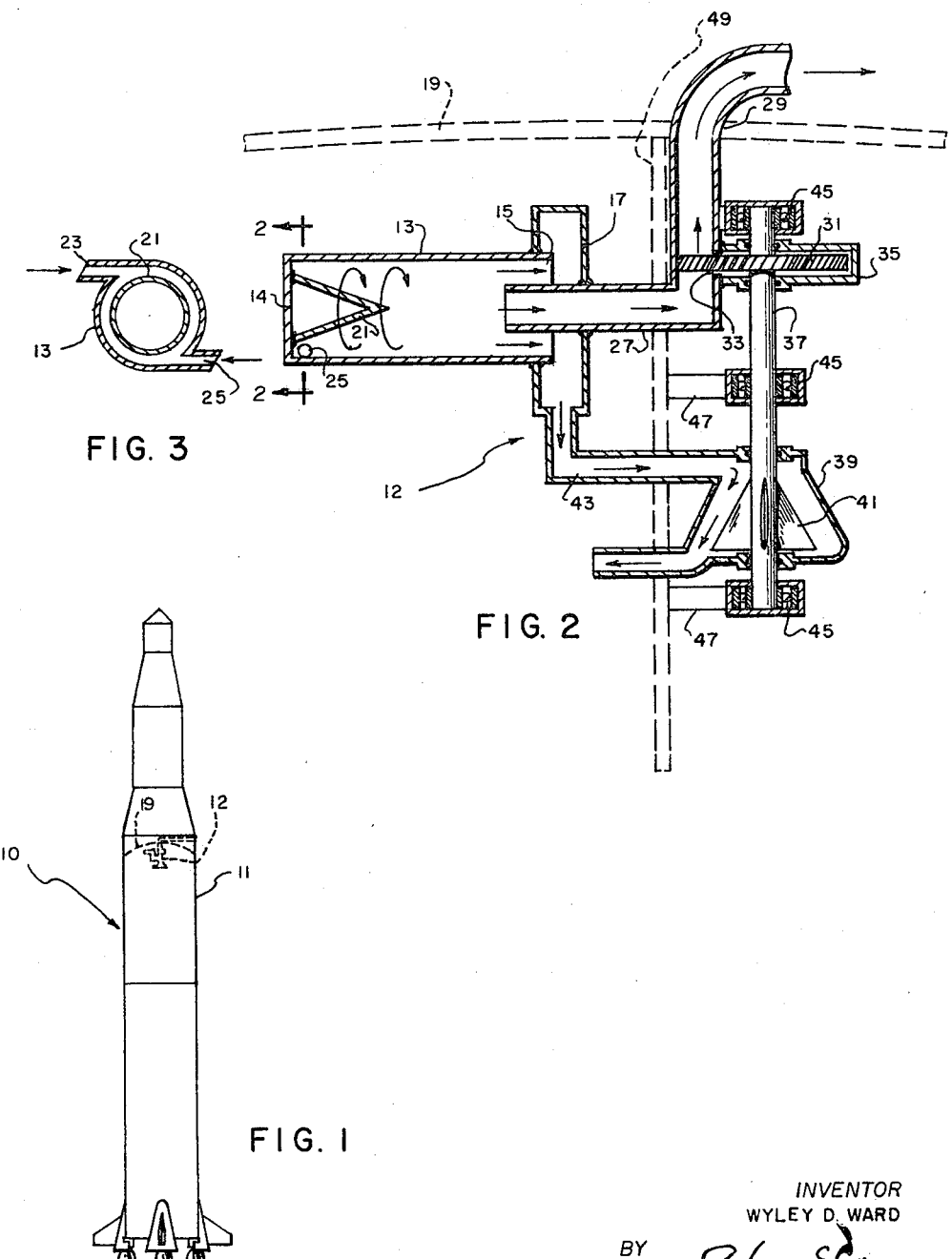

3,397,512
VAPOR-LIQUID SEPARATOR
James E. Webb, Administrator of the National Aeronautics and Space Administration with respect to an invention of Wyley D. Ward, Huntsville, Ala.
Filed Dec. 28, 1966, Ser. No. 605,518
3 Claims. (Cl. 55—204)

ABSTRACT OF THE DISCLOSURE

A device for separating vapor from liquid of a heterogeneous vapor-liquid fluid mixture ranging from 100% liquid to 100% vapor in a zero gravity environment wherein the separated vapor drives a pump that forces the separated liquid to the desired location thus avoiding the need for an additional power source to drive the pump. The heterogeneous fluid is expanded and swirled in a separation chamber and a vapor exhaust conduit receives the vapor at the central region of the swirl pattern while the liquid at the outer region of the swirl pattern is collected in a liquid collection manifold and pumped to the desired location.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to separating devices and more particularly to a device for separating vapor and liquid in a heterogeneous fluid mixture ranging from 100% liquid to 100% vapor.

In the development and operation of space vehicles, cryogenic fluids, such as liquid oxygen and liquid hydrogen, are used as propellants, and these propellants while in propellant tanks of a rocket in space absorb heat, causing the liquid to vaporize thereby increasing pressure in the tank. Unless the vapor is vented from the propellant tanks the tank will eventually become over-pressurized.

Under conditions of very low or zero gravity, such as exists in space, the vapor formed in the propellants will not readily rise and separate from the liquid; therefore, a heterogeneous fluid mixture of vapor and liquid forms, and it is required that a means be incorporated in the propellant tanks for separating the vapor from the liquid and venting the vapor overboard while returning the liquid to the tanks. Moreover, the mixture of vapor to liquid within the propellant tanks will be changing constantly making it necessary to effect separation of the vapor from the liquid at all mixtures ranging from 100% liquid to 100% vapor.

Separating devices of several types have been developed for a variety of purposes such as separating liquid droplets from a gas stream, as in steam power plants, separating particles from a gas and separating relatively heavy liquid from relatively light liquid of a heterogeneous mixture. These previous separations, however, have the disadvantage of not being capable of operating when the fluid being processed is 100% liquid or near 100% liquid at the inlets because no vapor is available for energizing the separator pump for pumping the separated liquid to the desired location.

Accordingly, it is a general object of the present invention to provide an improved separating device.

A more specific object of the invention is to provide a centrifugal separator vapor from liquid under near zero or zero gravity conditions which separator will effect separation of a heterogeneous fluid mixture ranging from 100% liquid to 100% vapor.

Another object of the invention is to provide a device for preventing excessive pressure from developing in propellant tanks of space vehicles by separating the vapor formed during the vaporization of a cryogenic fluid such as to vent the vapor overboard and return the liquid from the separating unit to the tank.

These and other objects and advantages of the invention will become apparent upon reference to the following specification, attendant claims and drawings:

Briefly described, the invention comprises a separation chamber having inlet swirl nozzles at one end thereof through which the fluid being separated enters and expands within the separation chamber imparting a centrifugal action to the incoming fluid and causing a portion of the incoming fluid to vaporize. The end the separation chamber opposite the swirl nozzles merges into a liquid collector manifold and a vapor venting conduit, the latter receiving the vapor occupying the central region of the swirl pattern and the liquid collector manifold collecting the vapor from the outer region of the swirl pattern. The vapor emerging from the separation chamber through the vapor venting conduit is utilized to energize a pump that forces the liquid from the liquid collector manifold into the propellant tank.

FIGURE 1 is an elevational view of a rocket having a stage thereof equipped with a vapor-liquid separator indicated in phantom line;

FIGURE 2 is a cross-sectional view of the vapor-liquid separator indicated in FIGURE 1 with the top of the propellant tank of the rocket stage indicated in phantom line;

FIGURE 3 is a cross-sectional view taken along line 2—2 of FIGURE 2.

Referring to FIGURE 1 therein is shown a rocket 10 comprising a stage 11 equipped with a vapor-liquid separator 12 at the top thereof. As shown in FIGURE 2, the separator 12 comprises a separation chamber 13 being circular in cross-section and closed at one end 14 with the opposite end 15 projecting into a liquid collection manifold 17. A top 19 of a propellant tank of the stage 11 is indicated in phantom line.

Joined to the closed end 14 of the separation chamber 13 is concentric relation thereto is a conical guide vane 21 having its converging end directed toward the liquid collection manifold 17. Swirl nozzles 23 and 25 (FIGURE 3) are located near the closed end 14 of the separation chamber 13, entering the chamber tangentially to the circular wall thereof. Near the other end of the separation chamber 13 is the open end of a vapor venting conduit 27 that is positioned concentrically with the chamber and extends through the wall of the liquid collection manifold before turning upwardly through the top 19 of the propellant tank and ultimately to the outside of the rocket 10.

Intersecting the vapor exhaust conduit 27 are the blades of a turbine 31 that turns in a slot 33 provided in the conduit 27 and in an enclosure 35 that merges with the conduit 27. The turbine 31 is connected to a verically disposed shaft 37 that extends into a housing 39 for an impeller pump 41 which is connected to the shaft 37. The housing 39 communicates with a conduit 43 that returns liquid from the liquid collection manifold into the tank. The shaft 37 turns in bearings 45 supported by brackets 47, which may be secured to a mounting bracket 49.

In operation of the separator, a cryogenic propellant, such as hydrogen, would typically be under pressure within the propellant tank of perhaps 20 p.s.i. and would enter the swirl nozzles 23 and 25 of the separation chamber 13. Due to the relatively low pressure in the separation chamber the fluid enters the separation chamber rapidly and subsequently expands producing a degree of vaporization of the fluid regardless of its vapor-liquid mixture at entry. The swirl nozzles and the conical guide vane 21 impart a centrifugal action to the fluid within the separation chamber 13 causing the vapor to concentrate in the center of the swirl pattern and the heavier liquid to concentrate in the outer region of the swirl pattern.

The vapor is collected into the vapor exhaust conduit 27, the open end of which is in the center of the separation chamber and the liquid is collected in the liquid collection manifold 17. As the vapor moves out of the separation chamber through the exhaust conduit 27 it impinges on the turbine 31 turning the turbine which in turn drives the impeller pump 41 through the shaft 37. The action of the pump 41 forces the liquid out of the liquid collection manifold and back into the tank through the conduit 43. The liquid that is returned to the tank will have been subcooled due to the expansion and vaporization occurring in the separator.

Since the separator always produces sufficient vapor to energize the turbine 31 even though the incoming fluid may be 100% liquid, no external power source for starting or otherwise driving the pump 41 is required.

Obviously, many modifications and variations of the present invention are possible in the light of the above teachings. It is therefore, to be understood that within the scope of the appended claims the invention may be practiced other than as specifically described.

What is claimed is:
1. A zero gravity vapor-liquid separator comprising:
   (a) a separation chamber having a closed end and an open end and a wall of circular cross section between said ends;
   (b) means for imparting a whirling motion to a fluid within said separation chamber;
   (c) a tangential fluid inlet in said chamber wall near said closed end;
   (d) a liquid collection manifold having a cross sectional diameter greater than said chamber wall and receiving said open end of said chamber with said open end opening into the interior of said manifold;
   (e) a vapor conduit for conducting vapor out of said separation chamber;
   (f) a portion of said vapor conduit extending through said manifold and into said open end of said chamber;
   (g) said portion having an open end concentrically disposed within said chamber;
   (h) the cross sectional diameter of said chamber wall exceeding the cross sectional diameter of said conduit portion;
   (i) pump means for pumping liquid from said manifold to a desired location;
   (j) said pump means including a drive means and an impeller with a housing enclosing said impeller;
   (k) said drive means including means intersecting said vapor conduit whereby vapor will impinge on said intersecting means and energize said drive means;
   (l) a liquid conducting conduit extending between said manifold and said impeller housing.

2. The invention as defined in claim 1 wherein said means for imparting a whirling motion includes a conical guide vane adjacent said inlet nozzle.

3. The invention as defined in claim 1 wherein said means intersecting said vapor conduit comprises a turbine, a drive shaft extending between said turbine and said impeller.

References Cited
UNITED STATES PATENTS

| | | | |
|---|---|---|---|
| 630,024 | 8/1899 | Baker | 55—404 X |
| 2,757,582 | 8/1956 | Freeman et al. | 55—205 X |
| 3,107,988 | 10/1963 | Taylor et al. | 55—269 X |
| 3,161,490 | 12/1964 | Dudek | 55—205 |
| 3,257,780 | 6/1966 | Webb | 55—404 X |
| 3,209,518 | 10/1965 | Spulgis et al. | 55—404 X |

RUBEN FRIEDMAN, *Primary Examiner.*

R. W. BURKS, *Assistant Examiner.*